United States Patent
Schroetlin et al.

(10) Patent No.: US 10,036,425 B2
(45) Date of Patent: Jul. 31, 2018

(54) METHOD OF SETTING BEARING SYSTEM

(71) Applicant: Caterpillar Inc., Peoria, IL (US)

(72) Inventors: Jeffrey L. Schroetlin, Argenta, IL (US); Christopher A. Monroe, Mt. Zion, IL (US)

(73) Assignee: Caterpillar Inc., Deerfield, IL (US)

( * ) Notice: Subject to any disclaimer, the term of this patent is extended or adjusted under 35 U.S.C. 154(b) by 142 days.

(21) Appl. No.: 15/137,088

(22) Filed: Apr. 25, 2016

(65) Prior Publication Data

US 2016/0238079 A1      Aug. 18, 2016

(51) Int. Cl.
| | |
|---|---|
| *F16C 43/00* | (2006.01) |
| *F16C 43/04* | (2006.01) |
| *F16C 25/06* | (2006.01) |
| *F16C 19/54* | (2006.01) |

(52) U.S. Cl.
CPC ............ *F16C 43/04* (2013.01); *F16C 19/547* (2013.01); *F16C 25/06* (2013.01); *F16C 2229/00* (2013.01)

(58) Field of Classification Search
CPC ........ F16C 43/04; F16C 19/547; F16C 25/06; F16C 2229/00
See application file for complete search history.

(56) References Cited

U.S. PATENT DOCUMENTS

| | | | |
|---|---|---|---|
| 4,172,621 A | 10/1979 | Yoshida | |
| 4,336,641 A | 6/1982 | Bhatia | |
| 5,061,089 A * | 10/1991 | Bair | F16C 25/08 384/517 |
| 5,975,867 A * | 11/1999 | Grant | B23P 19/04 418/107 |
| 6,202,306 B1 | 3/2001 | Miyazaki | |
| 6,588,119 B1 * | 7/2003 | Russell | F16C 35/067 33/517 |
| 6,705,965 B2 * | 3/2004 | Sullivan | F16C 19/56 475/220 |
| 6,865,809 B2 * | 3/2005 | Vorbeck | F16C 19/364 29/407.05 |
| 7,794,153 B2 * | 9/2010 | Szczepanski | B60B 35/18 384/519 |
| 9,091,298 B2 | 7/2015 | Szpara et al. | |

FOREIGN PATENT DOCUMENTS

| | | |
|---|---|---|
| CN | 103267061 | 8/2013 |
| CN | 204041950 | 12/2014 |
| DE | 3304358 | 8/1984 |
| WO | 2014135206 | 9/2014 |

* cited by examiner

*Primary Examiner* — Richard Chang
(74) *Attorney, Agent, or Firm* — Eric D. Misfeldt; Bart A. Fisher (57) ABSTRACT

A method of setting a bearing system is provided, The method includes applying a first set-up load to the bearing system. The method also includes measuring a first set-up clearance value between a cup carrier of at least one of a first tapered roller bearing and a second tapered roller bearings and a housing. The method further includes applying a second set-up load to the bearing system. The method includes measuring a second set-up clearance value between the cup carrier of at least one of the first and second tapered roller bearings and the housing. The method also includes determining a final set-up clearance value between the cup carrier of at least one of the first and second tapered roller bearings and the housing. The method further includes positioning a shim between the cup carrier of at least one of the first and second tapered roller bearings and the housing.

1 Claim, 6 Drawing Sheets

SECTION A-A

SECTION A-A'

FIG. 3

SECTION A-A'

METHOD OF SETTING BEARING SYSTEM

TECHNICAL FIELD

The present disclosure relates to a bearing system, and more particularly to a method of setting the bearing system having a first tapered roller bearing and a second tapered roller bearing.

BACKGROUND

When separable bearings, such as tapered roller bearings, are assembled into a given system, they must be assembled in a configuration that allows one cup-cone set to react against a second cup-cone set in order to assure neither cup-cone set separate during operation. Therefore, separable bearings generally have their cumulative axial internal clearance set during assembly. One method of setting tapered roller bearings includes applying a known set-up load to the bearing system, measuring the gap between a cup carrier and a housing, and using the gap measurement results to determine a shim thickness for final assembly. However, this method cannot be used when bearing system stiffness varies significantly from unit to unit and/or changes frequently due to modifications to structural components.

Additionally, errors can be introduced when a number of bolts at a specified torque are used to create the required set-up load due to variations in bolt torque coefficients of friction from bolt to bolt. Further, the error in load magnitude variability inherent to using bolts to apply the set-up load is magnified with the single point-gap measurement setting method because the resulting shim thickness is extrapolated using an averaged system stiffness.

U.S. Pat. No. 9,091,298, hereinafter referred to as the '298 patent, describes a pinion assembly preloading systems. The system includes a press actuator adapted to apply an axial force against a pinion assembly; a force sensor adapted to measure a reaction force at the pinion assembly. Further, the system includes a controller adapted to control the press actuator according to a change in the reaction force. However, the '298 patent does not disclose a method that improves bearing setting accuracy for systems where stiffness slope is erratic.

SUMMARY OF THE DISCLOSURE

According to an aspect of the present disclosure, a method of setting a bearing system is provided. The bearing system includes a first tapered roller bearing and a second tapered roller bearing. The first and second tapered roller bearings are spaced apart from each other along an axis of rotation. The method includes applying a first set-up load to the bearing system. The method also includes measuring a first set-up clearance value between a cup carrier of at least one of the first and second tapered roller bearings and a housing, based on the application of the first set-up load. The method further includes applying a second set-up load to the bearing system, wherein a value of the second set-up load is different from a value of the first set-up load. The method includes measuring a second set-up clearance value between the cup carrier of at least one of the first and second tapered roller bearings and the housing, based on the application of the second set-up load. The method also includes determining a final set-up clearance value between the cup carrier of at least one of the first and second tapered roller bearings and the housing, based on the first and second set-up clearance values. The method further includes positioning a shim between the cup carrier of at least one of the first and second tapered roller bearings and the housing, wherein a thickness of the shim corresponds to the final set-up clearance value.

Other features and aspects of this disclosure will be apparent from the following description and the accompanying drawings.

BRIEF DESCRIPTION OF THE DRAWINGS

FIG. 2 is a front view of an output transfer case of the powertrain of

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
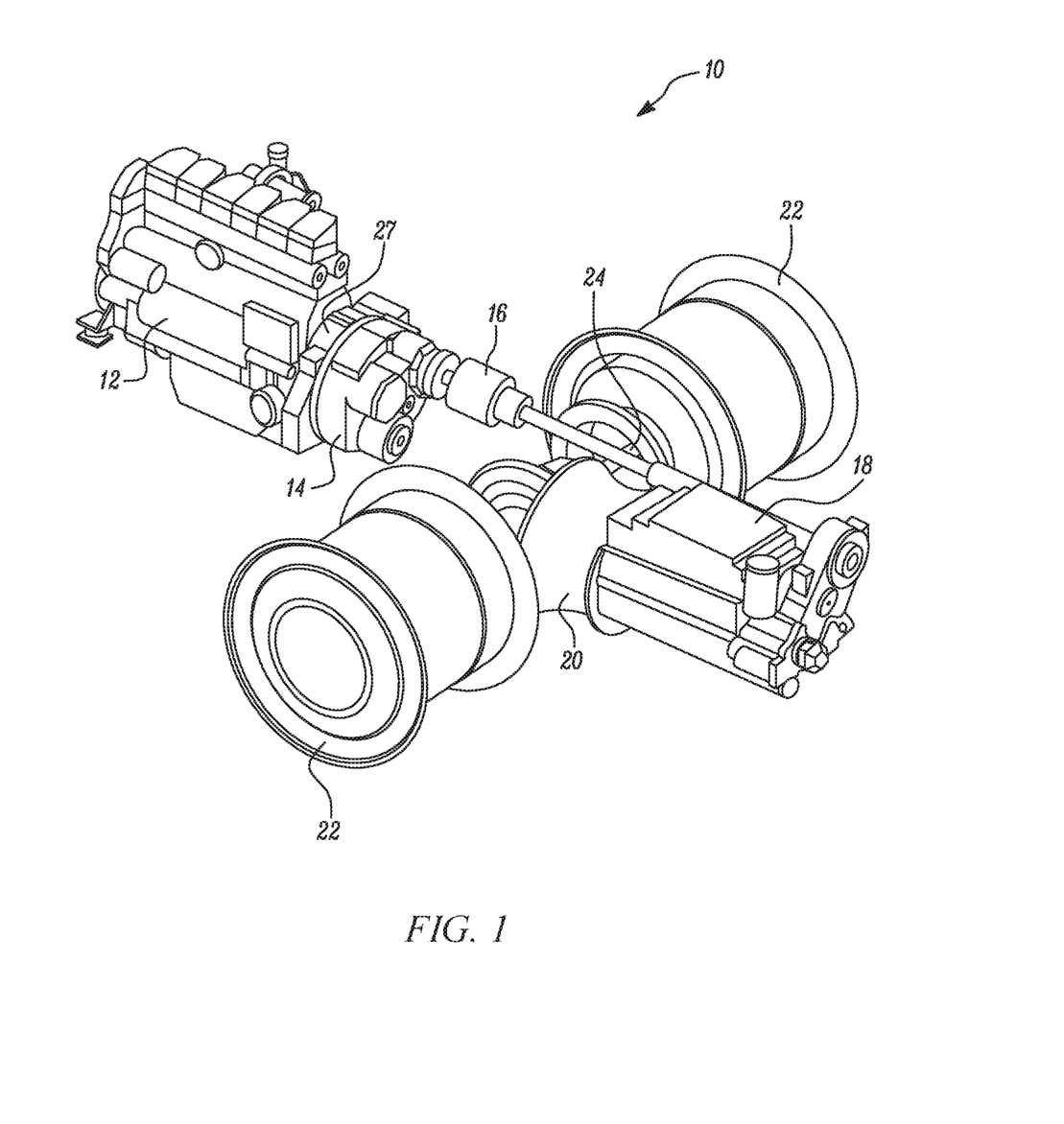
FIG. 1 is a perspective view of an exemplary powertrain associated with a machine.

FIG. 1 illustrates a schematic view of an exemplary powertrain, represented by numeral 10, in accordance with an embodiment of the present disclosure, The powertrain 10 may be deployed in a machine (not shown), The machine may include a tractor, a truck, a loader, an excavator, or any other similar wheeled or track-type machine. The powertrain 10 propels the machine in a direction of travel (not shown)

The powertrain 10 includes a power source 12 that provides power to the machine for operational and mobility requirements. In the illustrated example, the power source 12 is embodied as an engine. The engine may be an internal combustion engine, such as a compression ignition diesel engine, that bums a hydrocarbon-based fuel or any other combustible fuels. Alternatively, the power source 12 may embody any other type of engine, such as hybrid engine, or a solar powered engine, an electric motor, a power storage device like batteries or cells, a turbine, fuel cells, or any other suitable power source known in the art.

The powertrain 10 also includes an output transfer case 14 coupled to the power source 12, In the illustrated example, the output transfer case 14 is embodied as a gear-driven output transfer case. Alternatively, the output transfer case 14 may be a gear-driven output transfer case, a chain-driven output transfer case, or any other output transfer case known in the art. The output transfer case 14 will be described in detail later in this section.

The powertrain 10 includes a drive shaft 16 connected to the output transfer case 14. The power produced by the power source 12 that may be quantifiable as speed and/or torque, is delivered to a transmission system 18, by the output transfer case 14 and the drive shaft 16. The transmission system 18 is coupled to the drive shaft 16. The powertrain 10 also includes a differential 20 coupled to the transmission system 18. The transmission system 18 controls the power to be transmitted to the differential 20 as per an operator's instructions.

The powertrain 10 also includes a set of wheels, specifically a set of front wheels 22 and a set of rear wheels (not shown). In the illustrated example, the differential 20 is positioned between the set of front wheels 22. More particularly, the differential 20 is coupled to the set of front wheels 22 that is mounted on an axle 24. The axle 24 transmits a driving torque to the set of front wheels 22.

Figure 2:
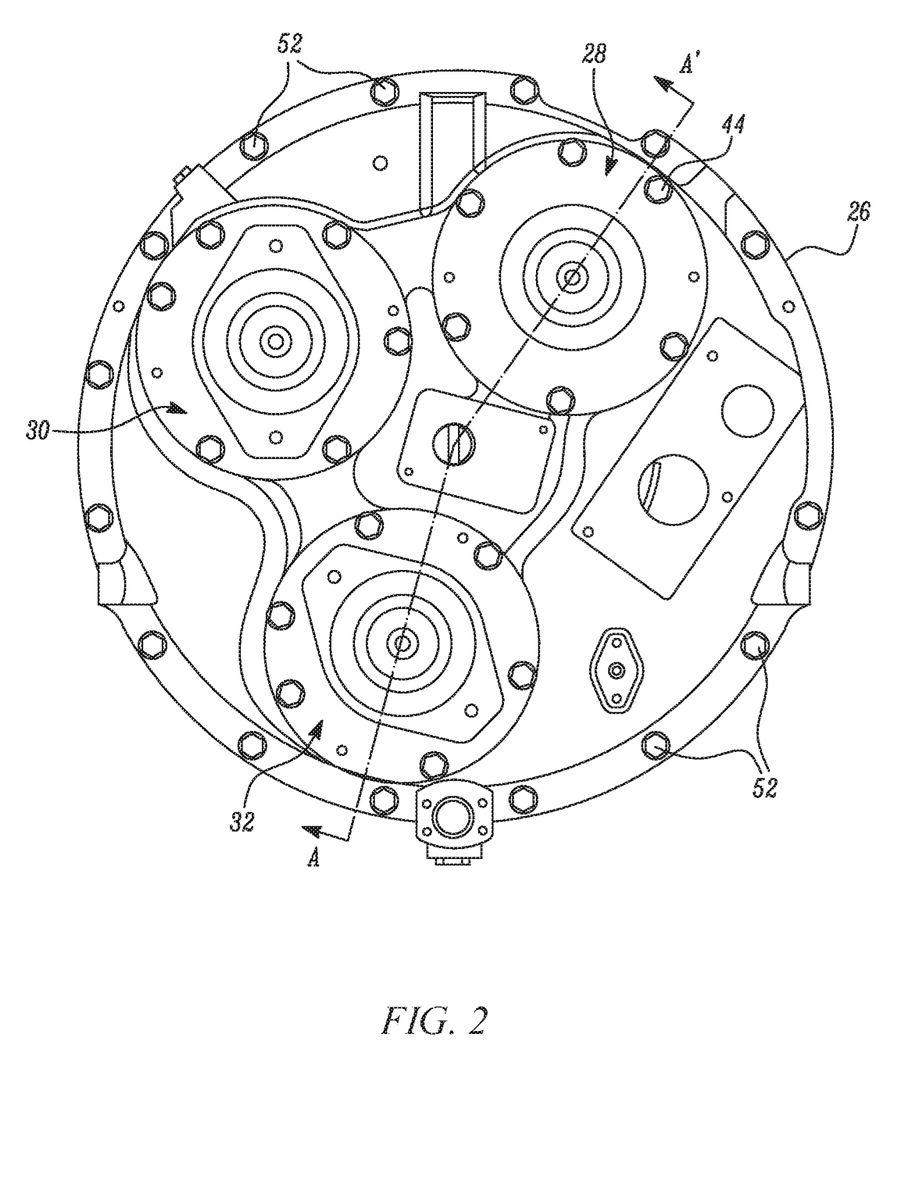

Referring to FIG. 2, a front view of the output transfer case 14 of the powertrain 10 is shown. The output transfer case 14 includes a housing 26. The housing 26 includes a number of bolts 52 detachably disposed on a periphery of the housing 26. The housing 26 is attached to a retarder housing 27 (shown in FIG. 1), via the number of bolts 52. The retarder housing 27 in turn couples the housing 26 with the power source 12, In one example, the housing 26 may be embodied as a metallic housing. Alternatively, the housing 26 may be a non-metallic housing. Further, the output transfer case 14 includes a first bearing system 28, a second bearing system 30, a third bearing system 32, and a fourth bearing system 34 (shown in FIG. 3) mounted within the housing 26. The housing 26 encloses the first, second, third, and fourth bearing systems 28, 30, 32, 34 of the output transfer case 14.

The first bearing system 28 is disposed around a first gear 36. The drive shaft 16 is drivably coupled to the first gear 36 using a mechanical coupling known in the art. The first gear 36 is drivably connected to the drive shaft 16. Further, each of the second bearing system 30, the third bearing system 32, and the fourth bearing system 34 is disposed around a second gear (not shown), a third gear 40, and a fourth gear 42, respectively. The first gear 36, the second gear, the third gear 40, and the fourth gear 42 are drivably coupled to each other. The first gear 36, the second gear, the third gear 40, and the fourth gear 42 may include any one of a spur gear, a skew gear, a helical gear, a bevel gear, or any other gear known in the art, without any limitations.

Figure 3:
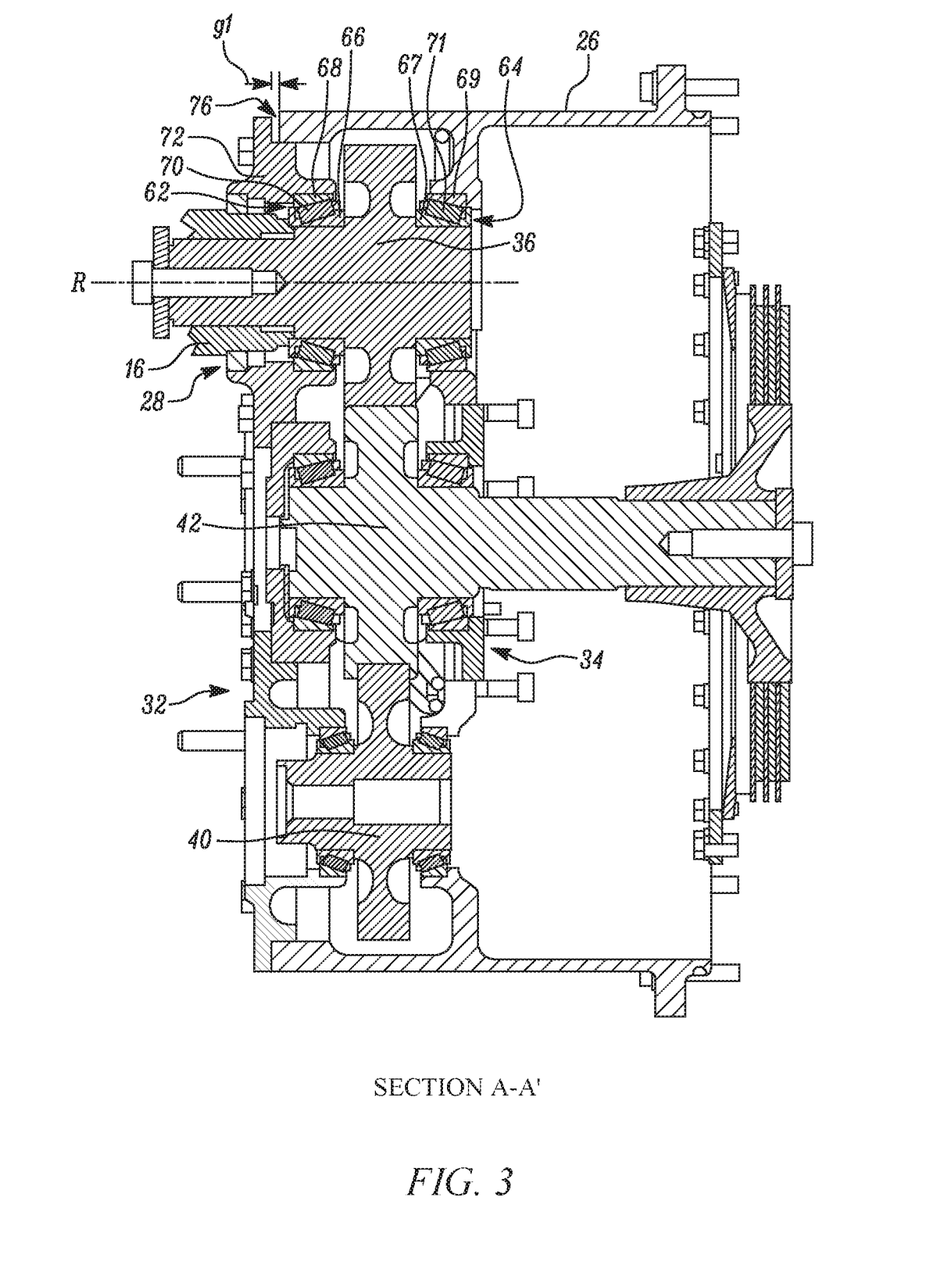
FIG. 3 is a cross-sectional view of the output transfer case having a bearing system, taken along line A-A' of FIG. 2.

The first bearing system 28 of the output transfer case 14 will now be explained in detail. It should be noted that the description of the first bearing system 28 provided below is equally applicable to the second, third, and fourth bearing systems 30, 32, 34, without limiting the scope of the present disclosure. FIG. 3 illustrates a cross-sectional view of the output transfer case 14 along a section line A-A (see FIG. 2). The first bearing system 28 includes a first tapered roller bearing 62, a second tapered roller bearing 64, and a first cup carrier 72. The first bearing system 28 further includes a number of bolts 44 (shown in FIG. 2). The bolts 44 removably couple the first cup carrier 72 with the housing 26. In the illustrated embodiment, the first bearing system 28 includes six bolts (see FIG. 2). Alternatively, the number of bolts 44 associated with the first bearing system 28 may vary based on system requirements.

The first tapered roller bearing 62 and the second tapered roller bearing 64 of the first bearing system 28 are spaced apart from each other along an axis of rotation "R" of the first gear 36. The first gear 36 is disposed between the first tapered roller bearing 62 and the second tapered roller bearing 64, along the axis of rotation "R". Each of the first and second tapered roller bearings 62, 64 includes a cone 66 and a cone 67, respectively, The cones 66, 67 are embodied as inner rings of the first and second tapered roller bearings 62, 64, respectively. Each of the first and second tapered roller bearings 62, 64 further includes a cup 68, and a cup 69, respectively. The cups 68, 69 are embodied as outer rings of the first and second tapered roller bearings 62, 64, respectively. The first tapered roller bearing 62 includes a number of rollers 70 disposed between the cup 68 and the cone 66. respectively. Further, the second tapered roller bearing 64 includes a number of rollers 71 disposed between the cup 69 and the cone 67, respectively. The number of rollers 70, 71 is assembled in such a manner that the rollers freely rotate adjacent to each other. The number of rollers 70, 71 reduces rotational friction between the cones 66, 67 and the cup 68, 69, respectively.

Figure 4:
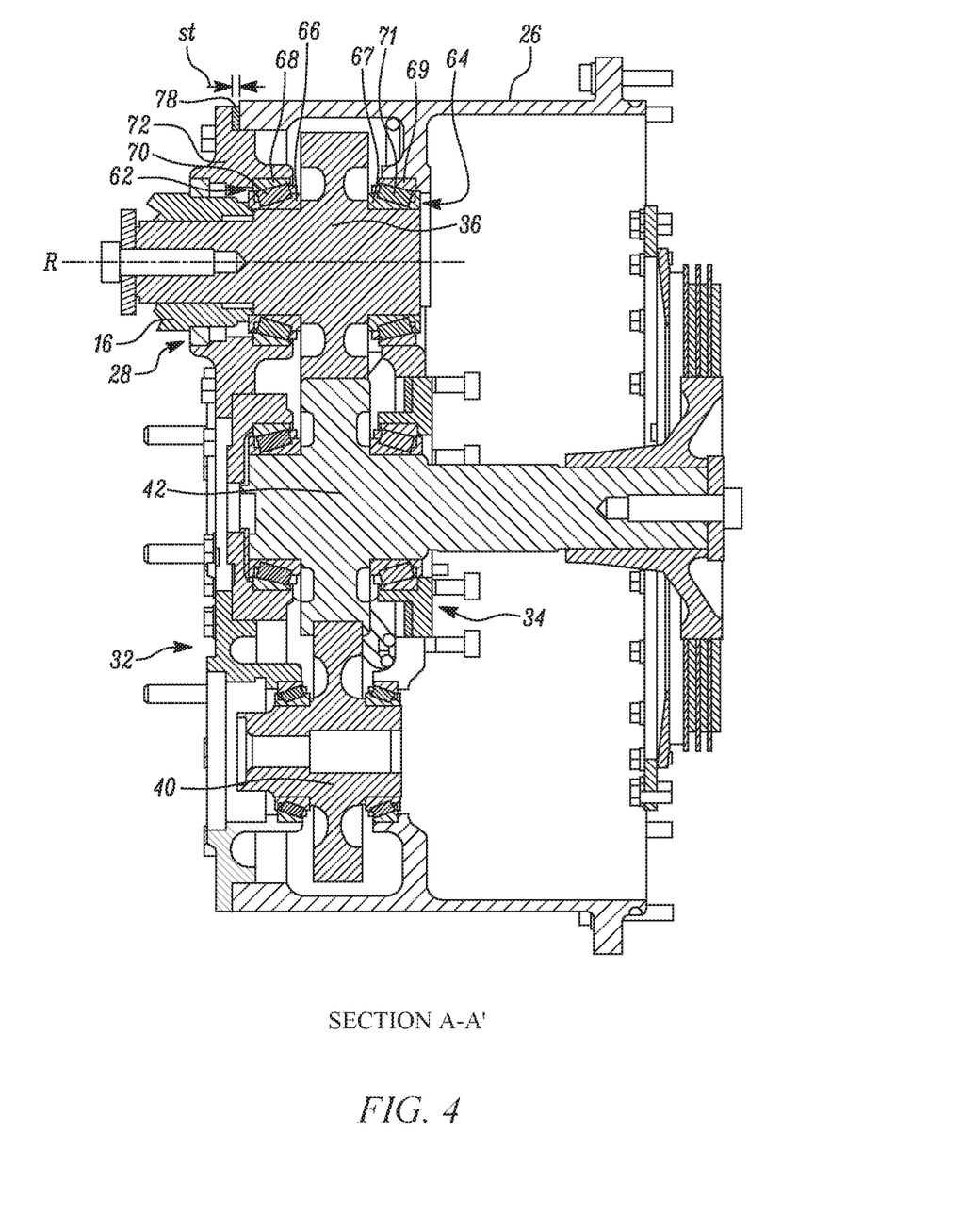
FIG. 4 is a cross-sectional view of the output transfer case having the bearing system and a shim installed therein.

The first tapered roller bearing 62 of the first bearing system 28 is enclosed by the first cup carrier 72. The first cup carrier 72 may be moved closer or away with respect to the housing 26, using the number of bolts 44. Further, a gap 76, along the axis of rotation "R", is set between the first cup carrier 72 and the housing 26 such that the first tapered roller bearing 62 is allowed to react against the second tapered roller bearing 64, so that they do not separate during an operation of the output transfer case 14. The gap 76 is an axial clearance between the housing 26 and the first cup carrier 72 of the first bearing system 28 which provides the target bearing system setting. A shim 78 (see FIG. 4) is received within the gap 76. A final thickness "g1" of the gap 76 is equivalent to a thickness "St" (see FIG. 4) of the shim 78. The final thickness "g1" of the gap 76 is hereinafter interchangeably referred to as the final set-up clearance value "g1".

In order to calculate the final thickness "g1" of the gap 76, a first set-up load "T1" is applied to the first bearing system 28. More particularly, the first set-up load "T1" is applied on the first cup carrier 72 of the first bearing system 28. The first set-up load "T1" may be applied on the first bearing system 28 using the bolts 44. In one example, two diagonally disposed bolts 44 may be used to apply the first set-up load "T1". Further, a mechanical press, a hydraulic press, or a pneumatic press may be used to apply the first set-up load "T1". It may be contemplated that any known system may be used to apply the first set-up load "T1" to the first bearing system 28.

Further, a value of the first set-up load "T1" may be decided based on historical data and/or tests that may be performed by an assembly personnel. In one example, the amount of the first set-up load "T1" may be 20 Nm. It should be noted that the value of the first set-up load "T1" may vary based on a size of the first bearing system 28 and/or the output transfer case 14. In some examples, the first set-up load "T1" may be applied to the first bearing system 28 in three steps, such that a partial set-up load is applied at each step. Further, the first gear 36 and the drive shaft 16 of the output transfer case 14 are rotated thrice after each step of application of the partial set-up loads. In one example, the first gear 36 and the drive shaft 16 of the output transfer case 14 are rotated in a clock-wise direction.

Consider an example where the first set-up load "T1" of 20 Nm is being applied to the first bearing system 28. In such an example, a first step of the first set-upload application may include application of a partial set-up load of 7 Nm. Further, the first gear 36 is rotated three times after the application of the partial set-up load. Similarly, a second step and a third step of the first set-up load application may include application of partial set-up loads of 12 Nm and 17 Nm. Also, the drive shaft 16 is rotated three times after the application of the partial set-up loads. Based on the application of the first set-up load "T1", a first set-up clearance value "G1" between the first cup carrier 72 and the housing 26 is measured.

Further, a second set-up load "T2" is applied to the first bearing system 28 after the measurement of the first set-up clearance value "G1". A value of the second set-up load "T2" may be decided based on historical data and/or tests that may be performed by the assembly personnel. A value of the second set-up load "T2" is different from the value of the first set-up load "T1". In one example, the amount of the second set-up load "T2" may be 40 Nm. It should be noted that the value of the second set-up load "T2" may vary based on a size of the first bearing system 28 and/or the output transfer case 14. In some examples, the second set-up load "T2" may be applied to the first bearing system 28 in three steps, such that a partial set-up load is applied at each step. Further, the first gear 36 and the drive shaft 16 of the output transfer case 14 are rotated thrice after each step of application of the partial set-up loads. In one example, the first gear 36 and the drive shaft 16 of the output transfer case 14 are rotated in a clock-wise direction.

Consider an example where the second set-up load "T2" of 40 Nm is being applied to the first bearing system 28. In such an example, a first step of the second set-up load application may include application of a partial set-up load of 15 Nm. Further, the first gear 36 is rotated three times after the application of the partial set-up load. Similarly, a second step and a third step of the second set-up load application may include application of partial set-up loads of 25 Nm and 32 Nm. Also, the first gear 36 is rotated three times after the application of the partial set-up loads. Based on the application of the second set-up load "T2", a second set-up clearance value "G2" between the first cup carrier 72 and the housing 26 is measured.

The first and second set-up clearance values "G1", "G2" may be measured using a gap measuring instrument, such as a feeler gauge or any other gauge member. It should be noted that any gap measuring instrument or technique may be used to measure the first and second set-up clearance values "G1", "G2", without limiting the scope of the present disclosure.

Figure 5:
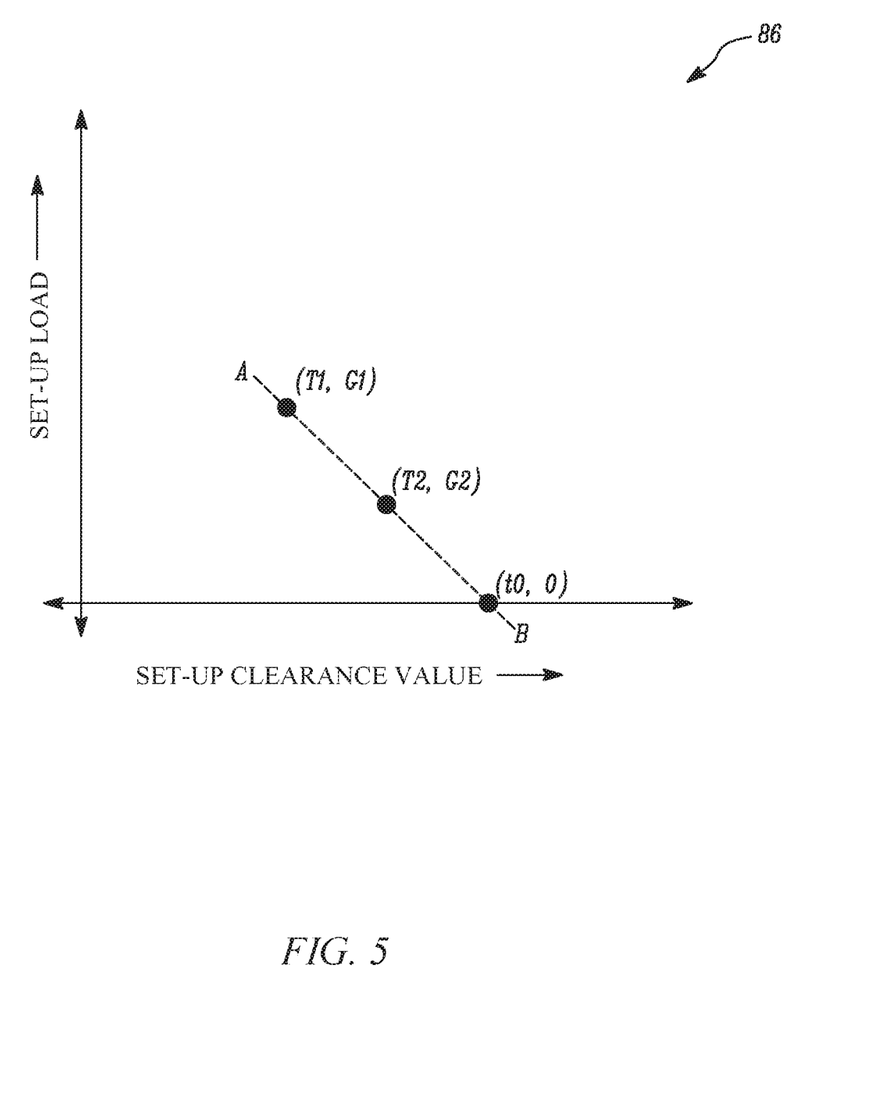
FIG. 5 is a graph to determine a final set-up clearance value for the bearing system associated with the output transfer case of FIGS. 3.

Based on the first and second set-up clearance values "G1", "G2", the final set-up clearance value "G1" between the first cup carrier 72 and the housing 26 is determined. A technique of calculating the final set-up clearance value "G1" will now be described in detail with reference to FIG. 5. Referring to FIG. 5, a graph 86 to determine the final set-up clearance value "G1" is illustrated. The set-up clearance values are marked on X-axis of the graph 86 and the set-up loads are marked on Y-axis of the graph 86. As illustrated, a first point (T1, G1) represents the first set-up clearance value "G1" at the first set-up load "T1" that is applied on the first cup carrier 72. Further, a second point (T2, G2) represents the second set-up clearance value "G2" at the second set-up load "T2" that is applied on the first cup carrier 72. A straight line "AB" drawn through the first point (T1, G1) and the second point (T2, G2) intersects the X-axis of the graph 86 at a point (t0, 0). A value of the set-up clearance at the point (t0, 0) gives a zero point setting where the axial clearance of the first bearing system 28 is zero.

Further, the thickness "St" of the shim 78 can also be calculated mathematically using the first and set-up loads "T1", "T2" and the first and second set-up clearance values "G1", "G2". The calculation of the thickness "St" of the shim 78 further includes determining a first shim constant "C1" using equation:

$$C1 = \left| \frac{(G1 - G2)}{1 - \frac{T2}{T1}} \right| + Pd \quad \text{(equation 1)}$$

Where, Pd is a predetermined target value of the axial setting of the bearing system 28. If "Pd" is positive, then there is an axial clearance or endplay in the bearing system 28. If "Pd" is negative, then there is an axial interference or preload in the bearing system 28.

Alternatively, the calculation of the thickness "St" of the shim 78 may be accomplished by determination of a second shim constant "C2" using equation:

$$C2 = \left| \frac{(G1 - G2)}{\frac{T1}{T2} - 1} \right| + Pd \quad \text{(equation 2)}$$

Where, Pd is a predetermined target value of the axial setting of the bearing system 28. If "Pd" is positive, then there is an axial clearance or endplay in the bearing system 28. If "Pd" is negative, then there is an axial interference or preload in the bearing system 28. The total thickness "St" of the shim 78 can be determined by using one of the two equations provided below:

$$t1 = G1 + C1 \quad \text{(equation 3)}$$

$$t1 = G2 + C2 \quad \text{(equation 4)}$$

It should be noted that the description provided above for determining the final set-up clearance value "G1" and the shim thickness "St" for the first bearing system 28 can also be used to determine a final set-up clearance value and a shim thickness for the second, third bearing systems, and fourth 30, 32, 34, without limiting the scope of the present disclosure.

In the present disclosure, the gap 76 is shown between the first cup carrier 72 and the housing 26. However, it should be noted that the gap may be present between any two components of the bearing systems which allow for adjustment or setting of the bearing systems. For example, the gap may be present between a shaft and a retainer plate of a particular bearing system application. The position of the gap may vary based on the type of application, without limiting the scope of the present disclosure.

A person of ordinary skill in the art will appreciate that the application of the bearing system explained herein is exemplary in nature, and that the teachings of the present disclosure may be applied to any machine/equipment that includes a bearing system, without any limitations, Various embodiments disclosed herein are to be taken in the illustrative and explanatory sense, and should in no way be construed as limiting the present disclosure.

INDUSTRIAL APPLICABILITY

The present disclosure relates to the bearing systems 28, 30, 32, 34 and a method 88 of setting the bearing systems 28, 30, 32, 34. For simplicity purposes, the method 88 will now be explained in reference to the first bearing system 28. However, it should be understood that the method 88 is equally applicable to the second, third, and fourth bearing systems 30, 32, 34, without limiting the scope of the present disclosure.

Figure 6:
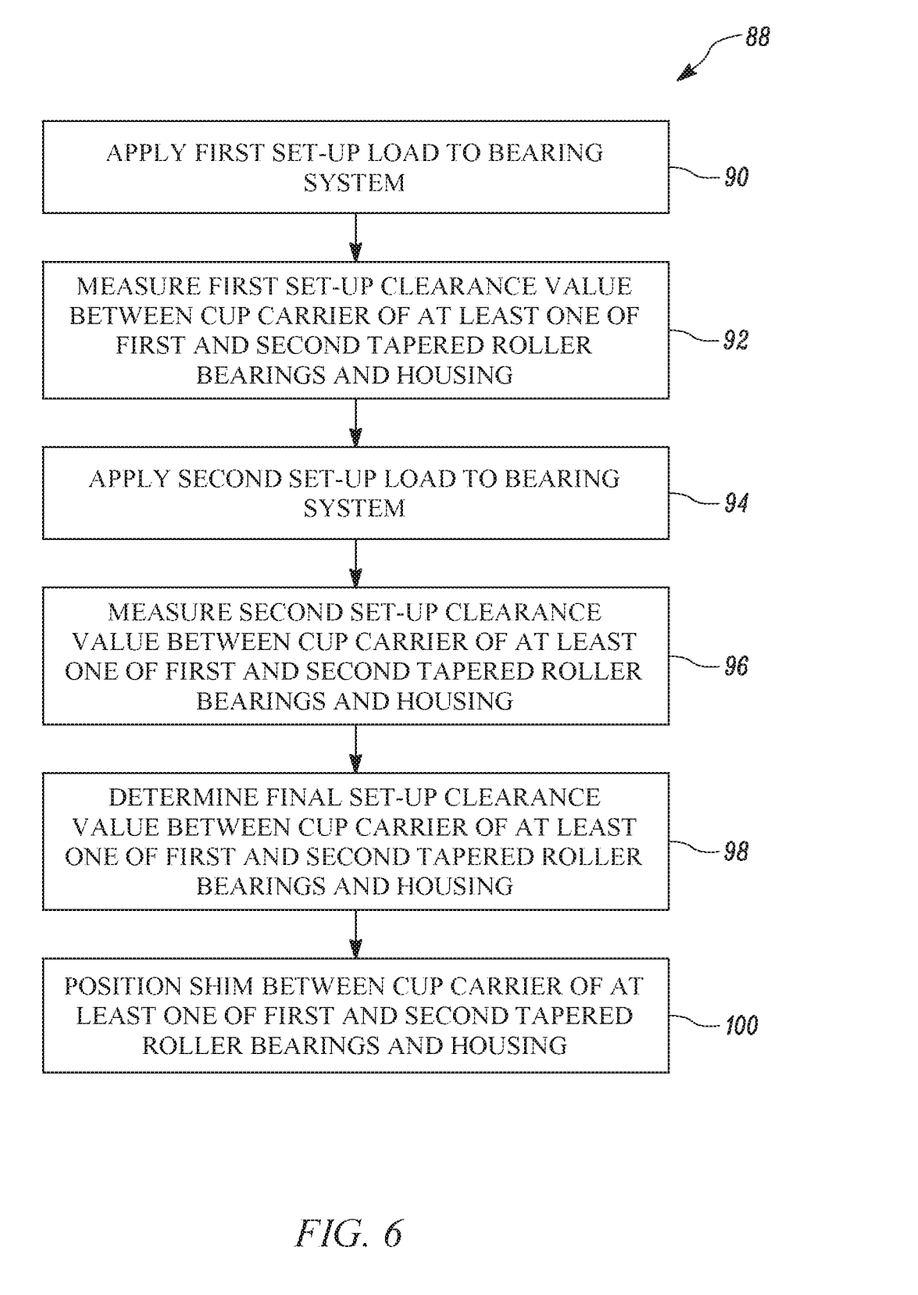
FIG. 6 is a flowchart for a method of setting the bearing system.

Referring to FIG. 6, a flowchart for the method 88 of setting the first bearing system 28 is illustrated. At step 90, the first set-up load is applied to the first bearing system 28. At step 92, the first set-up clearance value "G1" between the first cup carrier 72 and the housing 26 is measured, based on the application of the first set-up load "T1". The first set-up clearance value "G1" can be measured by inserting the gauge member in the gap 76 between the first cup carrier 72 and the housing 26.

At step 94, the second set-up load "T2" is applied to the first bearing system 28. The value of the second set-up load "T2" is different from the value of the first set-up load "T1". At step 96, the second set-up clearance value "G2" between the first cup carrier 72 and the housing 26 is measured, based on the application of the second set-up load "T2". The second set-up clearance value "G2" can be measured by inserting the gauge member in the gap 76 between the first cup carrier 72 and the housing 26.

At step 98, the final set-up clearance value "G1" between the first cup carrier 72 and the housing 26 is determined, based on the first and second set-up clearance values "G1", "G2". At step 100, the shim 78 is positioned between the first cup carrier 72 and the housing 26. The thickness "St" of the shim 78 corresponds to the final set-up clearance value "g1".

The method 88 disclosed herein is an accurate method of bearing setting as the method includes application of two different set-up loads and two set-up clearance value measurements, thus providing the necessary data to calculate the stiffness slope and customized setting offset for each individual production unit. The method 88 also improves bearing setting accuracy for systems where the stiffness slope is erratic.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method of setting a bearing system having a first tapered roller bearing and a second tapered roller bearing, wherein the first and second tapered roller bearings are spaced apart from each other along an axis of rotation, the method comprising:

applying a first set-up load to the bearing system;

measuring a first set-up clearance value between a cup carrier of at least one of the first and second tapered roller bearings and a housing, based on an application of the first set-up load;

applying a second set-up load to the bearing system, wherein a value of the second set-up load is different from a value of the first set-up load;

measuring a second set-up clearance value between the cup carrier of at least one of the first and second tapered roller bearings and the housing, based on an application of the second set-up load;

determining a final set-up clearance value between the cup carrier of at least one of the first and second tapered roller bearings and the housing, based on the first and second set-up clearance values; and positioning a shim between the cup carrier of at least one of the first and second tapered roller bearings and the housing, wherein a thickness of the shim corresponds to the final set-up clearance value.

* * * * *